(12) United States Patent
Bana

(10) Patent No.: US 10,764,429 B2
(45) Date of Patent: Sep. 1, 2020

(54) SYSTEM AND METHOD FOR DISPLAYING CONTENT ON A MOBILE COMMUNICATIONS DEVICE

(71) Applicant: Lakshman R. Bana, Herndon, VA (US)

(72) Inventor: Lakshman R. Bana, Herndon, VA (US)

( * ) Notice: Subject to any disclaimer, the term of this patent is extended or adjusted under 35 U.S.C. 154(b) by 643 days.

(21) Appl. No.: 13/742,041

(22) Filed: Jan. 15, 2013

(65) Prior Publication Data
US 2013/0183947 A1 Jul. 18, 2013

Related U.S. Application Data

(60) Provisional application No. 61/587,085, filed on Jan. 16, 2012.

(51) Int. Cl.
H04M 3/42 (2006.01)
H04M 3/428 (2006.01)

(52) U.S. Cl.
CPC ... *H04M 3/42153* (2013.01); *H04M 3/42042* (2013.01); *H04M 3/4285* (2013.01); *H04M 3/42093* (2013.01)

(58) Field of Classification Search
CPC ......... H04M 3/42017; H04M 3/42153; H04M 1/576; H04M 3/42042; H04M 3/4285; H04M 3/42093; H04M 1/72513; H04M 2201/50; H04M 7/123; H04M 3/42051; H04M 1/72522; H04L 67/14; H04L 65/1016; H04W 80/10; H04N 7/147; H04N 7/4285
See application file for complete search history.

(56) References Cited

U.S. PATENT DOCUMENTS 7,995,712 B2 8/2011 VanEpps, Jr.
8,150,024 B1 * 4/2012 Martin ............. H04M 3/42017
379/22.08

(Continued)

FOREIGN PATENT DOCUMENTS

KR 10-2007-0023378 A 2/2007
KR 10-2011-0097527 A 8/2011

OTHER PUBLICATIONS

3GPP TR29.882 V8.0.1 $3^{rd}$ Generation Partnership Project; Technical Specification Group Core Network and Terminals; Customized Alerting Tones (CAT) in 3GPP CS Domain (Release 8) Dec. 2008.*

(Continued)

*Primary Examiner* — George Eng
*Assistant Examiner* — Hung K Du
(74) *Attorney, Agent, or Firm* — Maier & Maier, PLLC

(57) ABSTRACT

A method for displaying content on a mobile communications device during an inactive call state. The method can include storing content for transmission to the mobile communications device, transmitting content to the mobile communications device in response to an event, and displaying the content on the mobile communications device while the mobile communications device is in an inactive call state, wherein the event includes a call initiation event or a call suspension event, wherein the inactive call state includes a call initiation state or a call suspension state, and wherein the content includes images, image sequences, or videos.

18 Claims, 9 Drawing Sheets

(56) References Cited

U.S. PATENT DOCUMENTS

| | | | |
|---|---|---|---|
| 2002/0136384 A1 | 9/2002 | McCormack et al. | |
| 2003/0032413 A1 | 2/2003 | Aksu et al. | |
| 2006/0294244 A1* | 12/2006 | Naqvi | H04M 7/123 |
| | | | 709/227 |
| 2007/0127705 A1* | 6/2007 | Wang | 379/373.01 |
| 2008/0002022 A1* | 1/2008 | VanEpps | 348/22 |
| 2009/0054092 A1* | 2/2009 | Stonefield | G06Q 30/0601 |
| | | | 455/466 |
| 2009/0168978 A1* | 7/2009 | Laws | H04M 3/4285 |
| | | | 379/93.17 |
| 2009/0238353 A1* | 9/2009 | Mani | H04M 3/493 |
| | | | 379/201.02 |
| 2010/0309282 A1* | 12/2010 | Hsieh | H04M 3/42017 |
| | | | 348/14.01 |
| 2011/0211129 A1* | 9/2011 | Lida | G06F 13/4269 |
| | | | 348/723 |
| 2012/0317218 A1* | 12/2012 | Anderson | H04N 21/4786 |
| | | | 709/206 |
| 2013/0003951 A1* | 1/2013 | Pitschel | H04M 3/4285 |
| | | | 379/93.13 |

OTHER PUBLICATIONS

James20, "What is the Difference Between Simplex Half-Duplex and Full-Duplex?", Techyv.com (Year: 2011).*

International Search Report dated Apr. 30, 2013, as issued in corresponding International Patent Application No. PCT/US2013/021650, filed Jan. 16, 2013.

* cited by examiner

SYSTEM AND METHOD FOR DISPLAYING CONTENT ON A MOBILE COMMUNICATIONS DEVICE

CROSS-REFERENCE TO RELATED APPLICATIONS

This application claims priority to U.S. Provisional Application 61/587,085, filed Jan. 16, 2012 and entitled CUSTOM VIDEO OR IMAGE DISPLAY WHEN CALL STATE IS INACTIVE—DIALING, RINGING, AND OnHOLD, the entire contents of which are hereby incorporated by reference.

BACKGROUND

Third-generation and fourth-generation (for example Long Term Evolution) networks are capable of delivering high speed data rates in mobile communication networks. Certain mobile devices, including smartphones, are capable of connecting to 2G, 3G, 4G, and WiFi networks. Such mobile devices are capable of connecting to one or more networks and receiving and transmitting data in parallel. For example, when a phone call is active or being connected via a 3G or 4G network, the mobile device is able to receive and transmit data in parallel using a WiFi network.

Typically, when one or more parties to a phone call is not active, for example, while on hold or being connected, a standard connecting or hold image is displayed on the party's mobile device. However, parties may wish to customize the connecting or hold image with personalized content, such as images, image sequences or videos. Therefore, a solution for displaying content from a first party on the mobile communications device of a second party is desired.

SUMMARY

According to at least one exemplary embodiment, a method for displaying content on a mobile communications device during an inactive call state is disclosed. The method can include storing content for transmission to the mobile communications device, transmitting content to the mobile communications device in response to an event, and displaying the content on the mobile communications device while the mobile communications device is in an inactive call state, wherein the event includes a call initiation event or a call suspension event, wherein the inactive call state includes a call initiation state or a call suspension state, and wherein the content includes images, image sequences, or videos.

According to another exemplary embodiment, a mobile communications device is disclosed. The device can include a processor, a non-transitory storage medium, a connectivity module for connecting to at least one communications network, and a mobile communications application, stored on the storage medium and executable by the processor, the mobile communications application being operable to cause content to be displayed on a second mobile communications device during initiation of a call with the second mobile communications device or during suspension of a call with the second mobile communications device.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
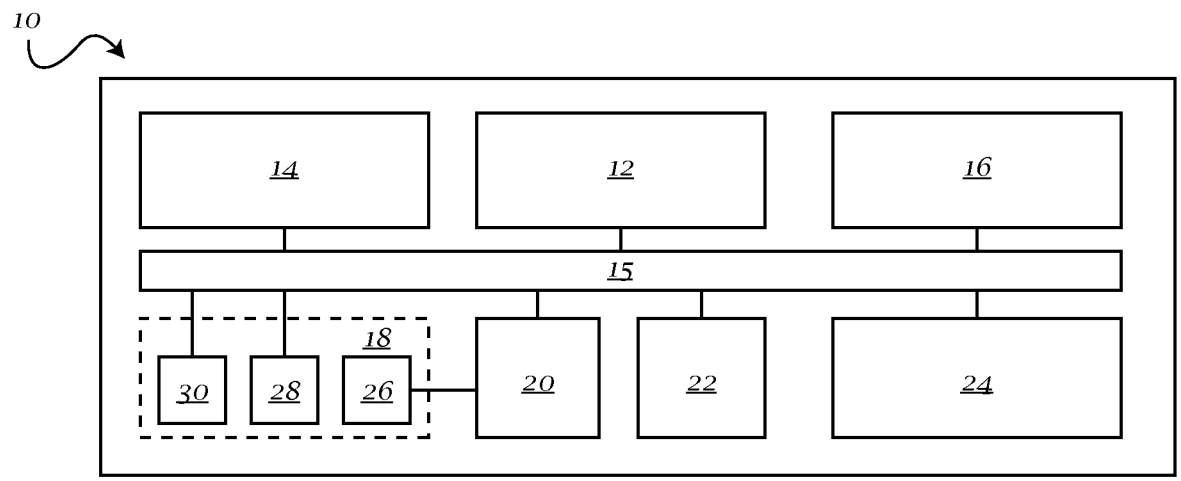
FIG. 1 is a block diagram of an exemplary mobile communications device.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration". The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Embodiments disclosed herein are directed towards displaying content, which can include video or images, in mobile communication devices, such as smartphones, tablets or laptop computers, when one or more parties are an inactive call state. As used herein, the term "inactive call state" includes: a call initiation state, and a call suspension state. As used herein, the term "call initiation state" includes: when a party is dialing, or otherwise sending a connection request to another party; and when a party's mobile device is ringing, or otherwise receiving a connection request from another party. As used herein, the term "call suspension state" includes: when a party is placed on hold, or otherwise has their connection suspended. The content may be stored on a mobile device or may be hosted on a server in communication with the network via which the parties are connected.

A user may store content for display on a remote party's mobile communications device. The content may be stored on the user's communications device or on a remote server. The content may include a plurality of images, image sequences, or videos. The specific content to be displayed may be selected per user-defined rules, randomly, or per server-defined rules. In some exemplary embodiments, the user may be able to customize the rules at any time, with or without the intervention of the carrier. Additionally, the user may be able to modify, add, or remove content as desired. The rules may include associating specific content with a particular party; may selecting default content for display to parties with which specific content is not associated, and may selecting whether, and which content is displayed to unknown parties. The content may further be organized by the user into content groups, wherein a content group is selected based on the above-described rules, and wherein particular content is selected, sequentially or randomly, from the content group, for display to a party.

The embodiments disclosed herein may be implemented by logic stored on a non-transitory medium in the mobile communications device. For example, the embodiments disclosed herein may be implemented by an operating system of the mobile communication device, by an application, such as a telephone application or telephone event monitoring application, installed on the mobile communication device, by instructions stored in a read-only memory of the mobile communications device, or by any known implementation that enables the embodiments to function as disclosed herein, any of which can be encompassed in the term "mobile communications application", as used herein.

The mobile communications application may display content when a call state is identified as "inactive", for example as "dialing", "ringing", or "on hold". If the content is stored on a memory of a local mobile communications device, the mobile communications application can retrieve the content and begin displaying the content on the local communications device, or transmit the content for display on a remote mobile communications device. Additionally, if the content is stored in a network server, then a telephony core network or a mobile communications device can send a signaling message to the network server. The network server can then interpret the received telephony event and transmit desired content to one or more mobile communications devices. Furthermore, if a Private Branch Exchange (PBX) is included in a call path, a telephony call state event may be received from the PBX.

FIG. 1 shows a diagram of an exemplary mobile communications device 10 on which embodiments of the system and method described herein may be implemented. The mobile communications device 10 can include one or more processors 12, a multimedia accelerator engine 14 which can function as a coprocessor, a bus 15, a memory 16, one or more peripheral devices 18, a display controller 20, an audio controller 22, and a connectivity module 24. Memory 16 can include one or more of diverse types of transitory or non-transitory storage media, for example, ROM, SRAM, SDRAM, xNAND, xDDR, Flash, or any other suitable memory device. Peripheral devices 18 can include a display 26, which may be any type of LCD, OLED, or any other suitable display, and may have touchscreen capabilities as well as a programmable display resolution and pixel rate. Peripheral devices 18 can also include a keypad 28 and soft keys 30, which may be hardware components or may be simulated on display 26. The audio controller 22 can be connected to audio input and output devices, such as speakers, microphones, and headset jacks of the mobile device. The connectivity module 24 can include transceivers suitable for connecting to cellular networks, including 2G, 3G, and 4G networks, WiFi networks, Bluetooth networks, or any other desired communications networks.

Figure 2:
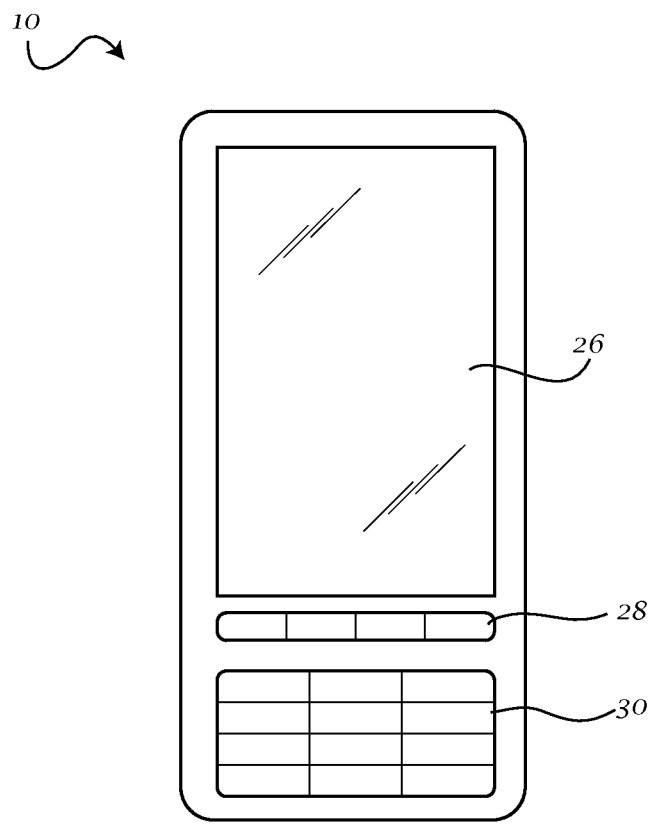
FIG. 2 shows an exemplary mobile communications device.

FIG. 2 shows an exemplary mobile communications device 10. The user can interact with the device using display 26, keypad 28, and/or soft keys 30. Display 26 may also be used to show text or multimedia content.

Figure 3A:
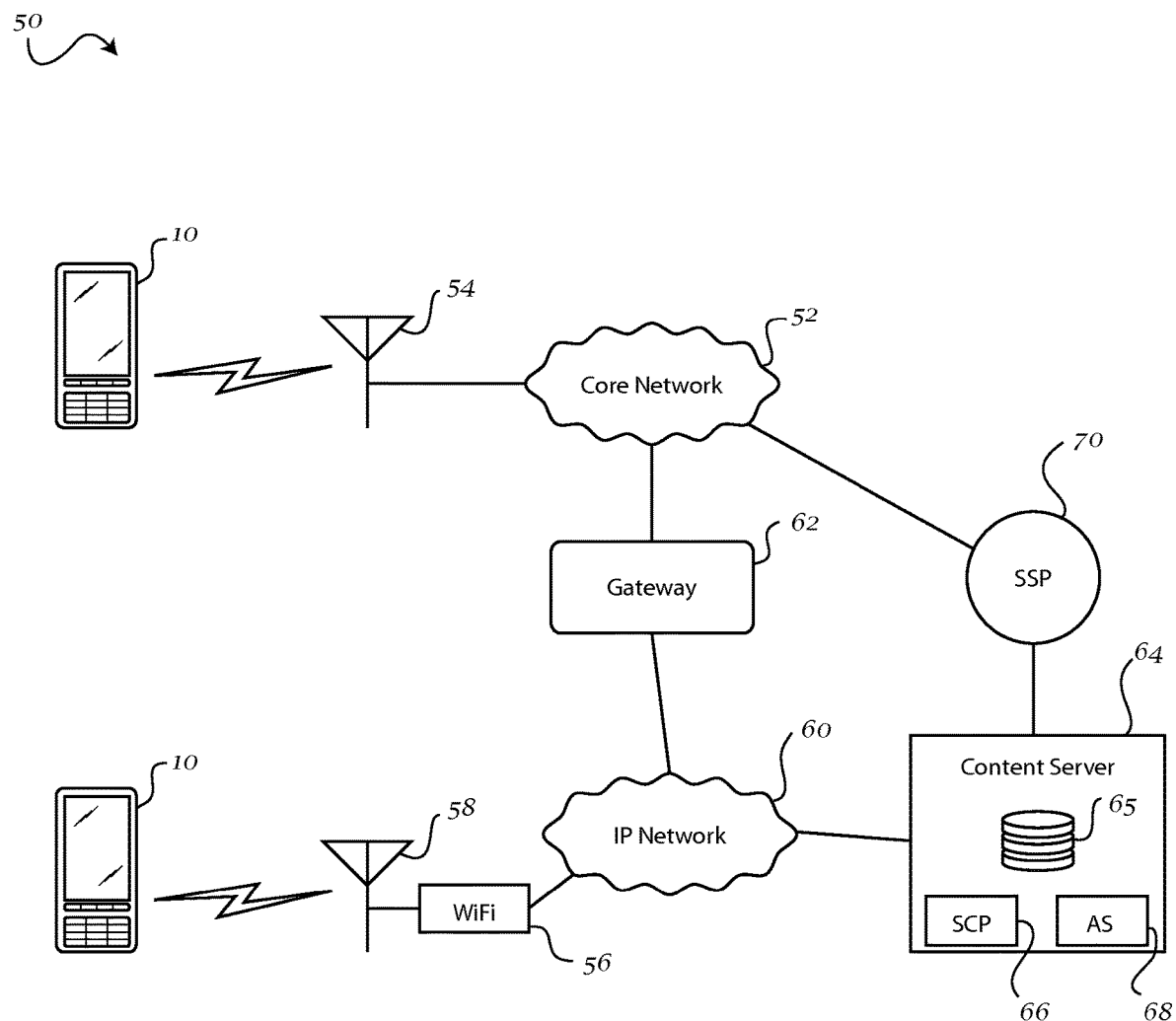
FIGS. 3a-3b are diagrams of exemplary communications networks.

FIG. 3a is a diagram showing the architecture of an exemplary communications network 50 on which embodiments of the system and method described herein may be implemented. A mobile communications device 10 may connect to a core network 52, such as a Public Land Mobile Network (PLMN), and/or a WiFi network 56 using the corresponding transceivers of the device 10. Mobile communications device 10 may connect to core network 52 via, for example, a base station 54 and to WiFi network 56 via, for example, an access point 58. The WiFi network may be in communication with an IP network 60. IP network 60 may be in communication with core network 52 via a gateway 62, which may be a Packet Data Gateway (PDG), a Gateway GPRS Support Node (GGSN) or any other suitable gateway providing packet data functionality between IP network 60 and core network 52.

A content server 64 may be in communication with core network 52 and/or IP network 60. Content server 64 can act a Service Control Point (SCP) 66 and/or an application server (AS) 68 with respect to communications network 50. Basic call state events may be sent to content server 64 by the service switching function in a Service Switching Point (SSP) 70 or by mobile device 10. The SCP 66 may also request basic call state events from the SSP 70. On receipt of basic call state events at SCP 66, the content server may push the content to the mobile device.

Figure 3B:
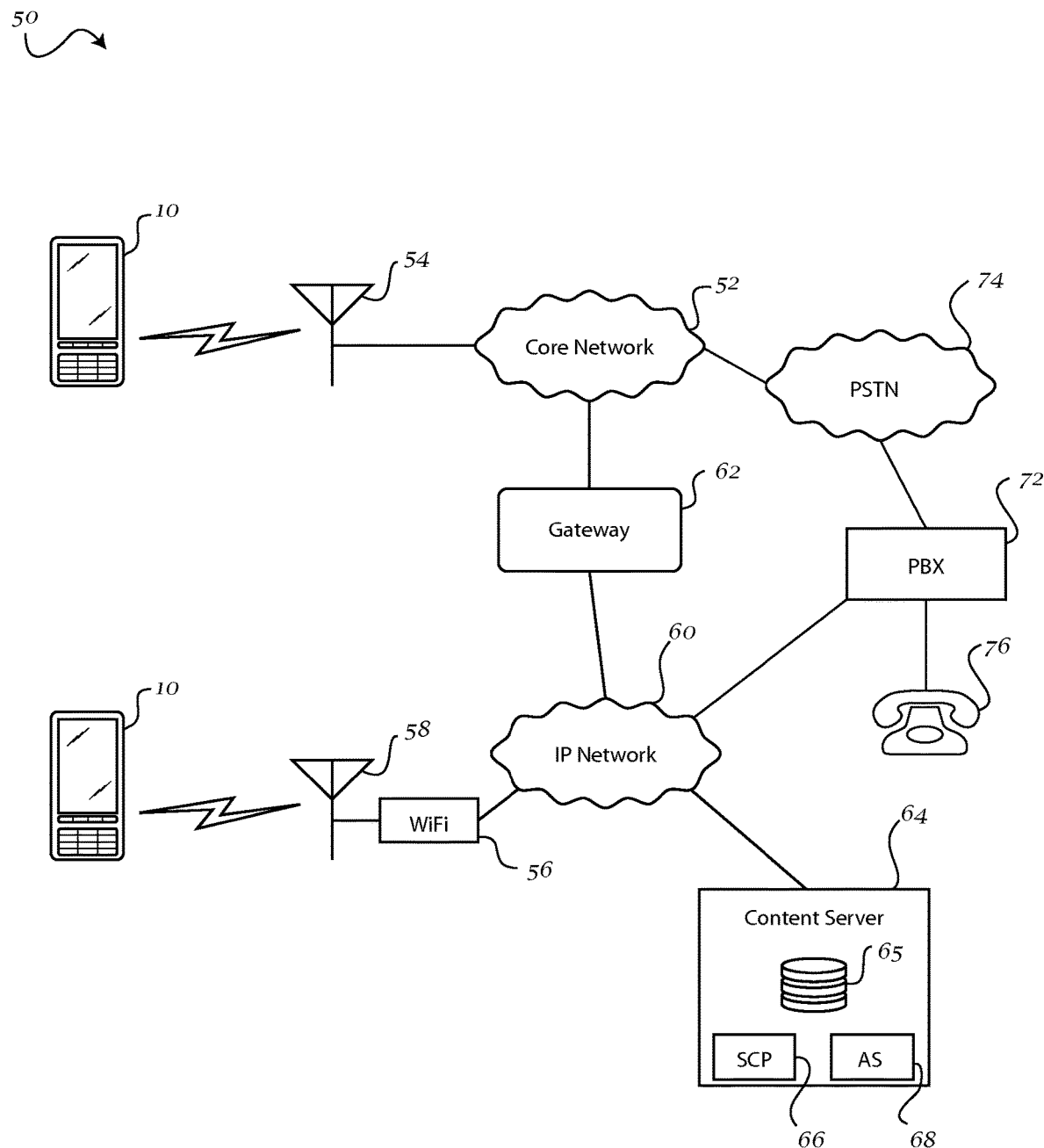

In some exemplary embodiments, as shown in FIG. 3b, a PBX 72 may be in communications with core network 52 and IP network 60. The PBX 72 may be connected to core network 52 via a Public Switched Telephone Network (PSTN) 74. The PBX 72 may include at least one communications device 76.

A user of a mobile communications device 10 may select content to be displayed to a remote party during inactive call states. Such content may include video files, image files, or image sequences. The content may be stored in a memory 16 of the mobile communications device 10, or may be stored in a database 65 of content server 64. Additionally, the user may have a plurality of contacts stored in an address book of the mobile communications device 10. The user can associate one or more specific content files with a particular contact or contacts in the address book. The user can also select one or more content files to be displayed to contacts which do not have specific content files associated therewith. Furthermore, the user can select one or more content files to be displayed to remote parties that are not stored in the user's address book.

In some exemplary embodiments, when a first mobile communication device initiates a call, receives an incoming call, or places a call in progress on hold, the mobile communications application in the first device may issue a signaling message to content server 64; alternatively, core network 52 may issue the signaling message to content server 64. Upon receipt of the signaling message, content server 64 may analyze the signaling message, retrieve desired content from database 65, and send the content to a second mobile communications device for display thereon. Core network 52 may view content server 64 as an SCP 66, and the SCP 66 can request call state events from SSP 70.

So as to deliver content to the second mobile communications device, the content server 64 may need to resolve the address information of the second mobile communications device. In some exemplary embodiments, address resolution may be provided by the mobile communications device of the second party sending its address information to SCP 66, for example via Session Initiation Protocol (SIP) or IP Multimedia Subsystem (IMS). In other exemplary embodiments, to resolve the address of the second mobile communications device, the SCP 66 or AS 68 may probe core network 52 for the address information of the mobile communications device.

In other exemplary embodiments, when a first mobile communication device 10 initiates a call, receives an incoming call, or places a call in progress on hold, the mobile communications application in the first device may retrieve desired content from memory 16 of the device, and send the content directly to a second mobile communications device for display thereon.

Figure 4:
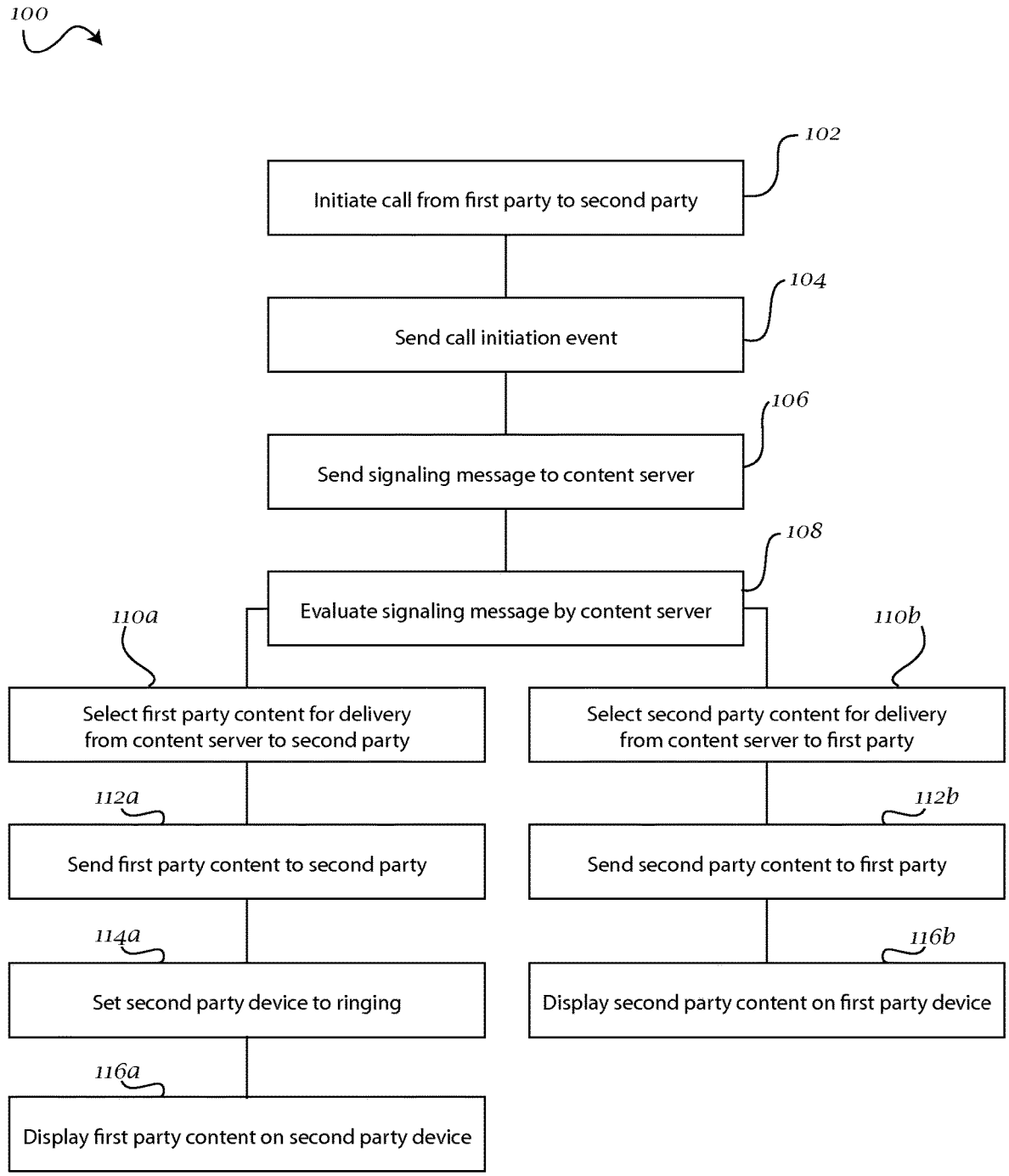
FIG. 4 shows an exemplary method of displaying content, wherein a first party places a phone call to a second party, and the content is stored on a content server.

FIG. 4 shows an exemplary method of displaying content 100, wherein a first party places a phone call to a second party, and the content is stored on a content server. At step 102, a first party can place a call to a second party, for example by selecting the second party's name or number from an address book or by manually dialing the second party's number. Consequently, at step 104, a call initiation event may be sent from the first party, and the state of the mobile communications application of the first party can be changed from "idle" to "dialing". Upon identifying the first party state as "dialing", a signaling message can be sent, at step 106, to content server 64 acting as an SCP 66 or AS 68. The signaling message may be sent by the mobile communications application on the first party's communications device, or by the telephony core network 52. At step 108, content server 64 can evaluate the signaling message so as to determine the first party and determine the second party.

At step 110*a*, content server 64 can select the content of the first party for delivery to the second party. For example, the content server can determine whether the second party is a contact in the address book of the first party. If the second party is a contact, the content server can determine whether the first party associated any specific content to the second party. If specific content is associated with the second party, the content server can select the specific content for delivery. If no specific content is associated with the second party, the server can select the first party's default content for delivery to the second party. If the second party is not a contact, the server can select the default content, or not select any content, based on user preferences for parties that are not contacts.

Subsequently, at step 112*a*, the content server can resolve the address of the second party and send the selected first party content to the mobile communications device of the second party. At step 114, when the call initiation event is received by the second party, the state of the mobile communications application of the second party can be changed from "idle" to "ringing". At step 116*a*, the mobile communications device of the second party can display the received first party content while the state of the mobile communications application is "ringing".

Additionally, at step 110*b*, the content server 64 can select the content of the second party for delivery to the first party. For example, the content server can determine whether the first party is a contact in the address book of the second party. If the first party is a contact, the content server can determine whether the second party associated any specific content to the first party. If specific content is associated with the first party, the content server can select the specific content for delivery. If no specific content is associated with the first party, the server can select the second party's default content for delivery to the first party. If the first party is not a contact, the server can select the default content, or not select any content, based on user preferences for parties that are not contacts.

Subsequently, at step 112*b*, the content server can resolve the address of the first party and send the selected second party content to the mobile communications device of the first party. At step 116*b*, the mobile communications device of the first party can display the received second party content while the state of the mobile communications application is "dialing".

When the second party accepts the incoming call, the displays of both the first and second parties can transition to a standard "call in progress" interface of the particular mobile communications device. Alternatively, if the second party rejects the incoming call, the displays of both the first and second parties can transition to a "call cancelled", idle, or other suitable interface of the particular mobile communications device.

Figure 5:
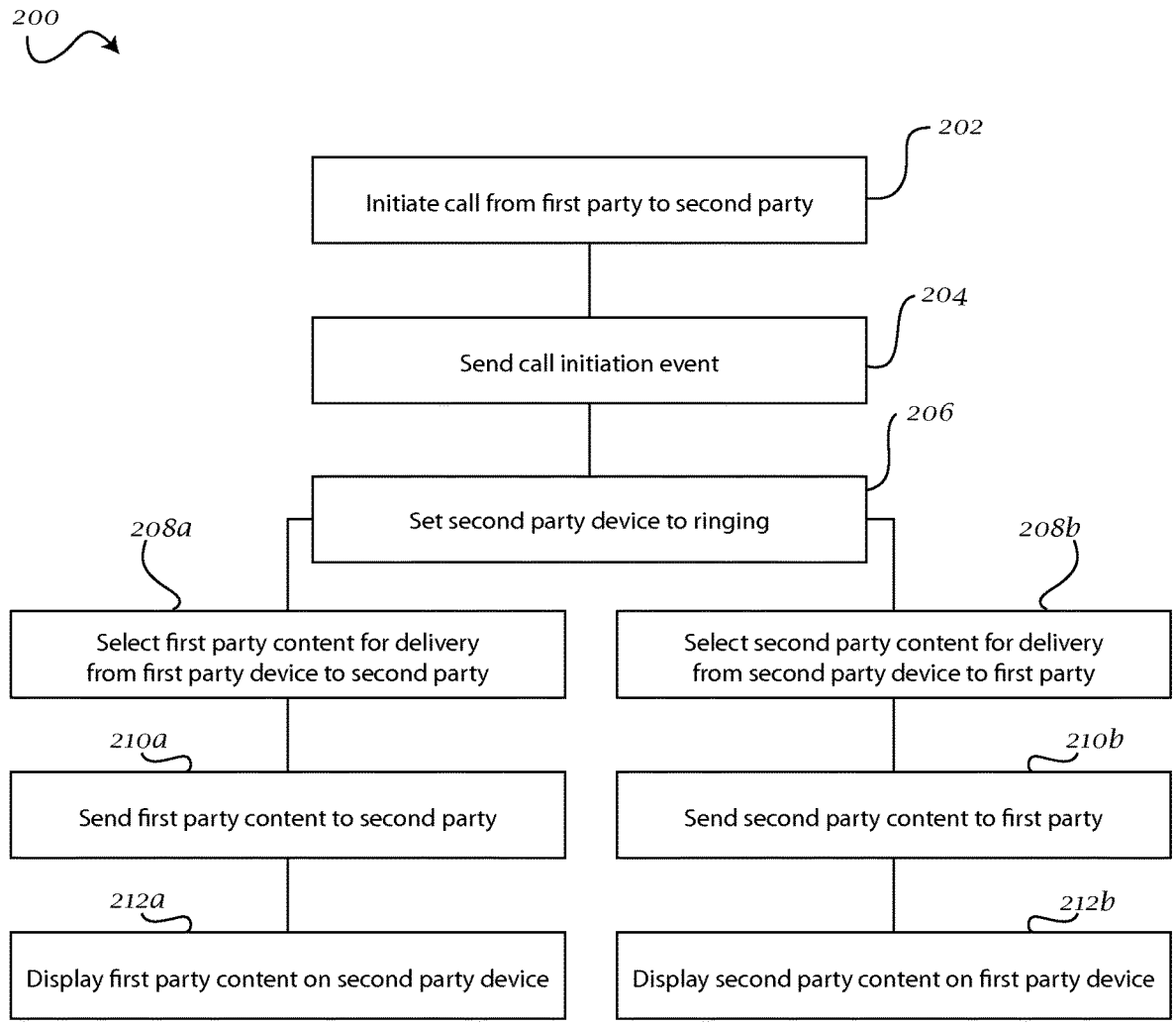
FIG. 5 shows an exemplary method of displaying content, wherein a first party places a phone call to a second party, and the content is stored on the mobile communications devices of the parties.

FIG. 5 shows an exemplary method of displaying content 200, wherein a first party places a phone call to a second party, and the content is stored on the mobile communications devices of the parties. At step 202, a first party can initiate a call to a second party, for example by selecting the second party's name or number from an address book or by manually dialing the second party's number. Consequently, at step 204, a call initiation event may be sent from the first party, and the state of the mobile communications application of the first party can be changed from "idle" to "dialing". At step 206, when the call initiation event is received by the second party, the state of the mobile communications application of the second party can be changed from "idle" to "ringing".

At step 208*a*, the mobile communications application of the first party can select the content of the first party for delivery to the second party. For example, the mobile communications application of the first party can determine whether the second party is a contact in the address book of the first party. If the second party is a contact, the mobile communications application can determine whether the first party associated any specific content to the second party. If specific content is associated with the second party, the mobile communications application can select the specific content for transmission. If no specific content is associated with the second party, the mobile communications application can select the first party's default content to be sent to the second party. If the second party is not a contact, the mobile communications application can select the default content, or not select any content, based on user preferences for parties that are not contacts.

Subsequently, at step 210*a*, the mobile communications application of the first party can send the selected content to the mobile communications device of the second party. At step 212*a*, the mobile communications device of the second party can display the received first party content while the state of the mobile communications application of the second party is "ringing".

Similarly, at step 208*b*, the mobile communications application of the second party can select the content of the second party for delivery to the first party. For example, the mobile communications application of the second party can determine whether the first party is a contact in the address book of the second party. If the first party is a contact, the mobile communications application can determine whether the second party associated any specific content to the first party. If specific content is associated with the first party, the mobile communications application can select the specific content for transmission. If no specific content is associated with the first party, the mobile communications application can select the second party's default content to be sent to the first party. If the first party is not a contact, the mobile communications application can select the default content, or not select any content, based on user preferences for parties that are not contacts.

Subsequently, at step 210*b*, the mobile communications application of the second party can send the selected content to the mobile communications device of the first party. At step 212*b*, the mobile communications device of the first party can display the received second party content while the state of the mobile communications application of the first party is "dialing".

Figure 6:
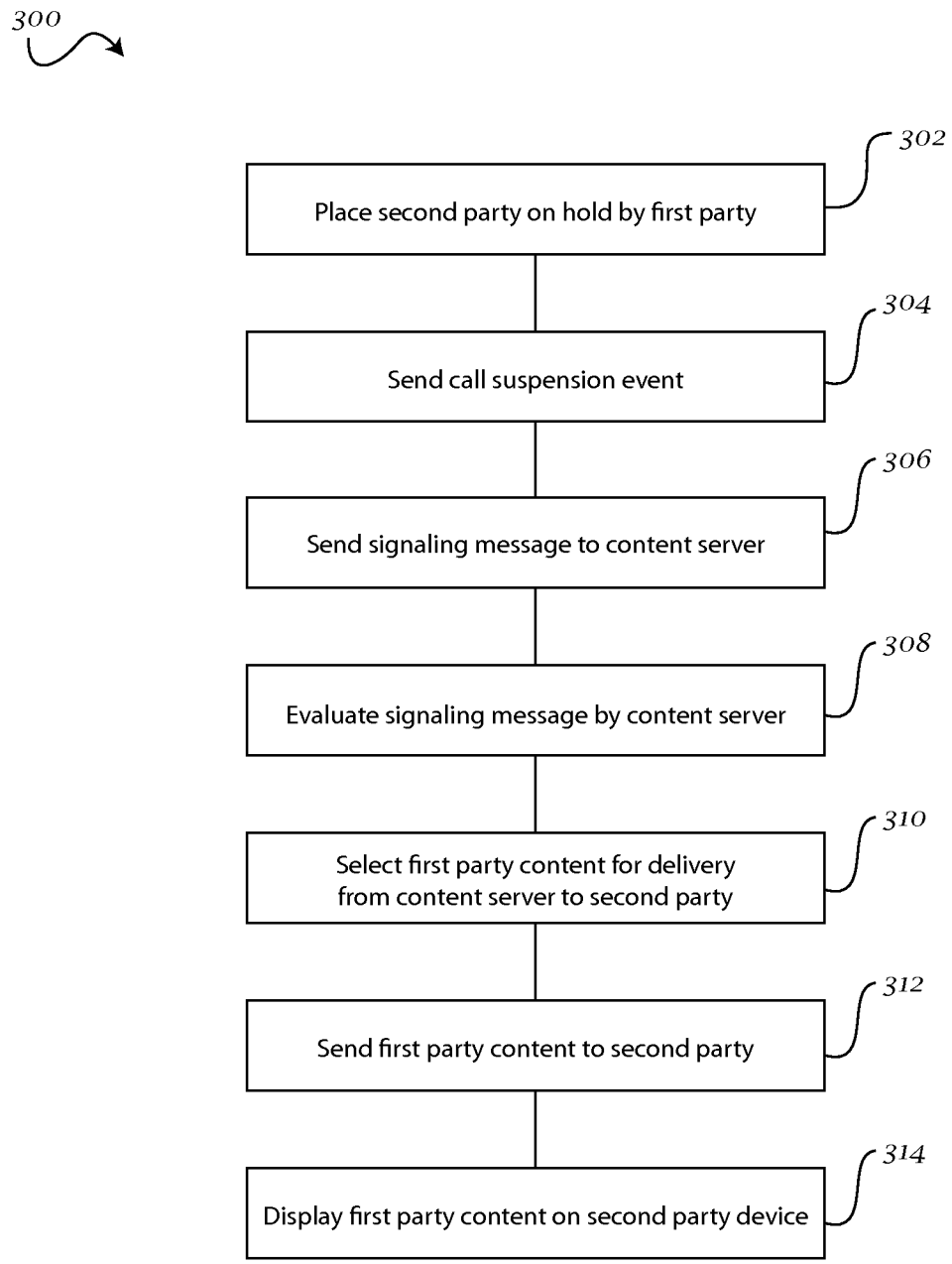
FIG. 6 shows an exemplary method of displaying content, wherein a first party places a second party on hold, and the content is stored on a content server.

FIG. 6 shows an exemplary method of displaying content 300, wherein a first party places a second party on hold, and the content is stored on a content server. At step 302, during a call in progress between a first party and a second party, the first party can place the second party on hold, for example by answering an incoming call, or by activating a call hold feature. Consequently, at step 304, a call suspension event may be sent from the first party, and the state of the mobile communications application of the second party can be changed from "call in progress" to "on hold". Upon placing the second party on hold, a signaling message can be sent, at step 306, to content server 64 acting as an SCP 66 or AS 68. The signaling message may be sent by the mobile communications application on the first party's communications device, or by the telephony core network 52. At step 308, content server 64 can evaluate the signaling message so as to determine the first party and determine the second party.

At step 310, content server 64 can select the content of the first party for delivery to the second party, in a substantially similar manner to that described in step 110*a*. Subsequently, at step 312, the content server can resolve the address of the second party and deliver the selected first party content to the mobile communications device of the second party. At step 314, the mobile communications device of the second party can display the received first party content while the state of the mobile communications application of the second party is "on hold".

Figure 7:
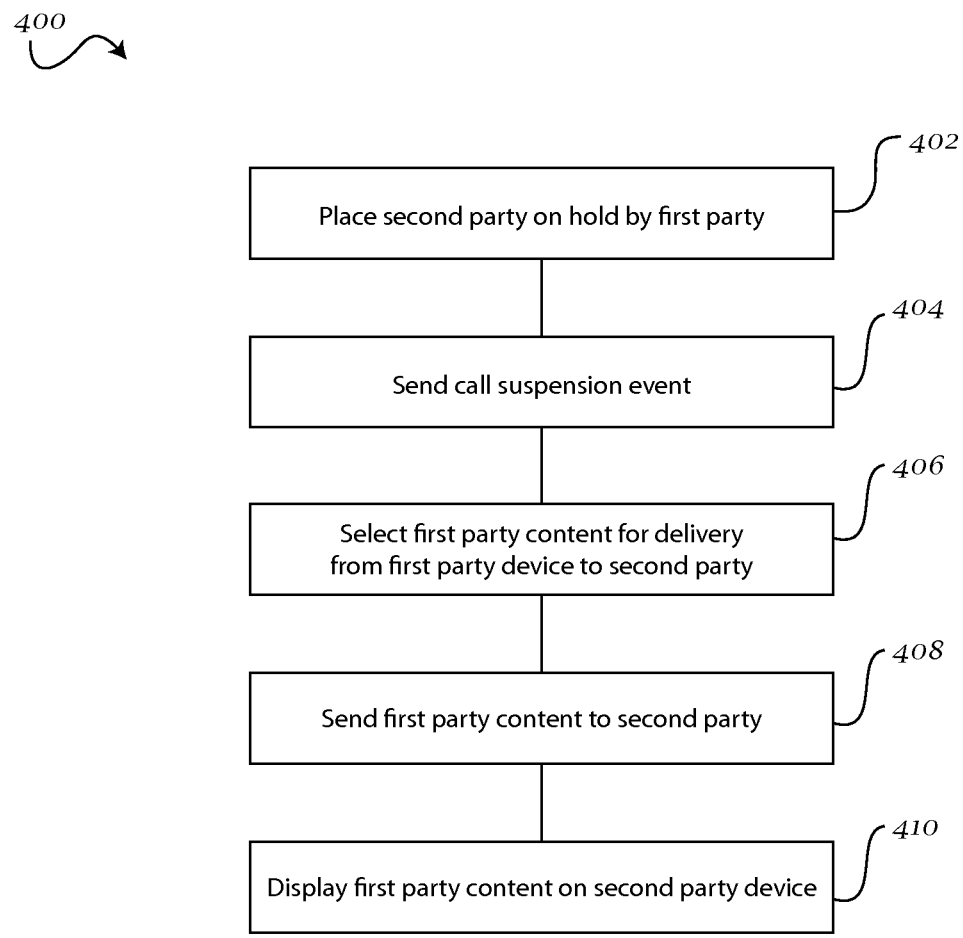
FIG. 7 shows an exemplary method of displaying content, wherein a first party places a second party on hold, and the content is stored on the mobile communications device of the first party.

FIG. 7 shows an exemplary method of displaying content 400, wherein a first party places a second party on hold, and the content is stored on the mobile communications device of the first party. At step 402, during a call in progress between a first party and a second party, the first party can place the second party on hold, for example by answering an incoming call, or by activating a call hold feature. Consequently, at step 404, a call suspension event may be sent from the first party, and the state of the mobile communications application of the second party can be changed from "call in progress" to "on hold".

At step 406, the mobile communications application of the first party can select the content of the first party for delivery to the second party, in a substantially similar manner to that described in step 208*a*. Subsequently, at step 408, the mobile communications application of the first party can send the selected content to the mobile communications device of the second party. At step 410, the mobile communications device of the second party can display the received first party content while the state of the mobile communications application of the second party is "on hold".

Figure 8:
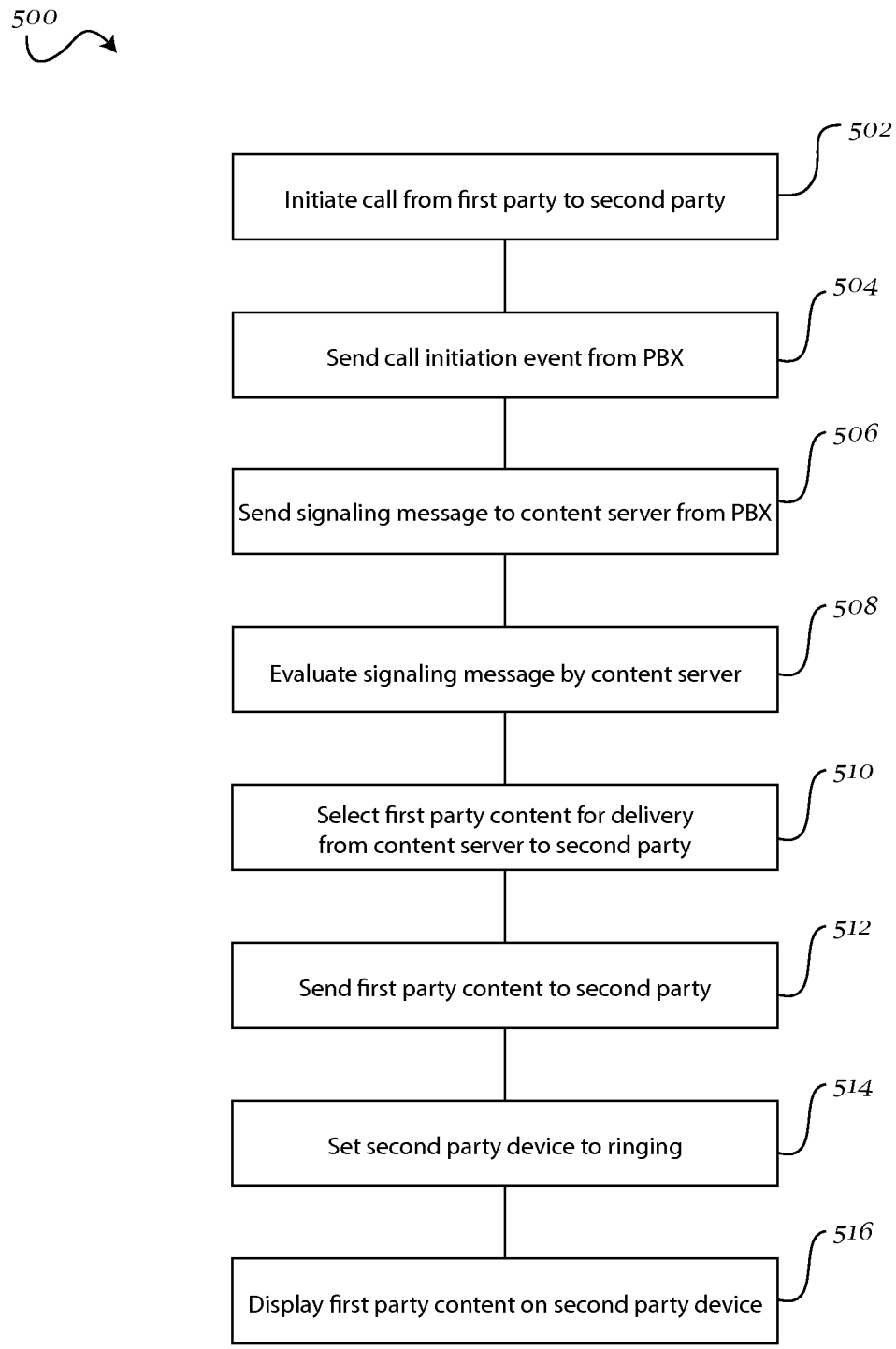
FIG. 8 shows an exemplary method of displaying content, wherein a first party places a phone call to a second party, the first party is behind a PBX, and the content is stored on a content server.

FIG. 8 shows an exemplary method of displaying content 500, wherein a first party places a phone call to a second party, the first party is behind a PBX 720, and the content is stored on a content server 64. At step 502, a first party can initiate a call to a second party, for example by selecting the second party's name or number from an address book or by manually dialing the second party's number. At step 504, the PBX can recognize the dialing state of the communications device 76 of the first party and send a call initiation event. Upon identifying the first party state as "dialing", the PBX can send a signaling message, at step 506, to content server 64 acting as an SCP 66 or AS 68. At step 508, content server 64 can evaluate the signaling message so as to determine the first party and determine the second party.

At step 510, content server 64 can select the content of the first party for delivery to the second party, in a substantially similar manner to that described in step 110*a*. Subsequently, at step 512, the content server can resolve the address of the second party and deliver the selected first party content to the mobile communications device of the second party. At step 514, when the call initiation event is received by the second party, the state of the mobile communications application of the second party can be changed from "idle" to "ringing". At step 516, the mobile communications device of the second party can display the received first party content while the state of the mobile communications application of the second party is "ringing".

Figure 9:
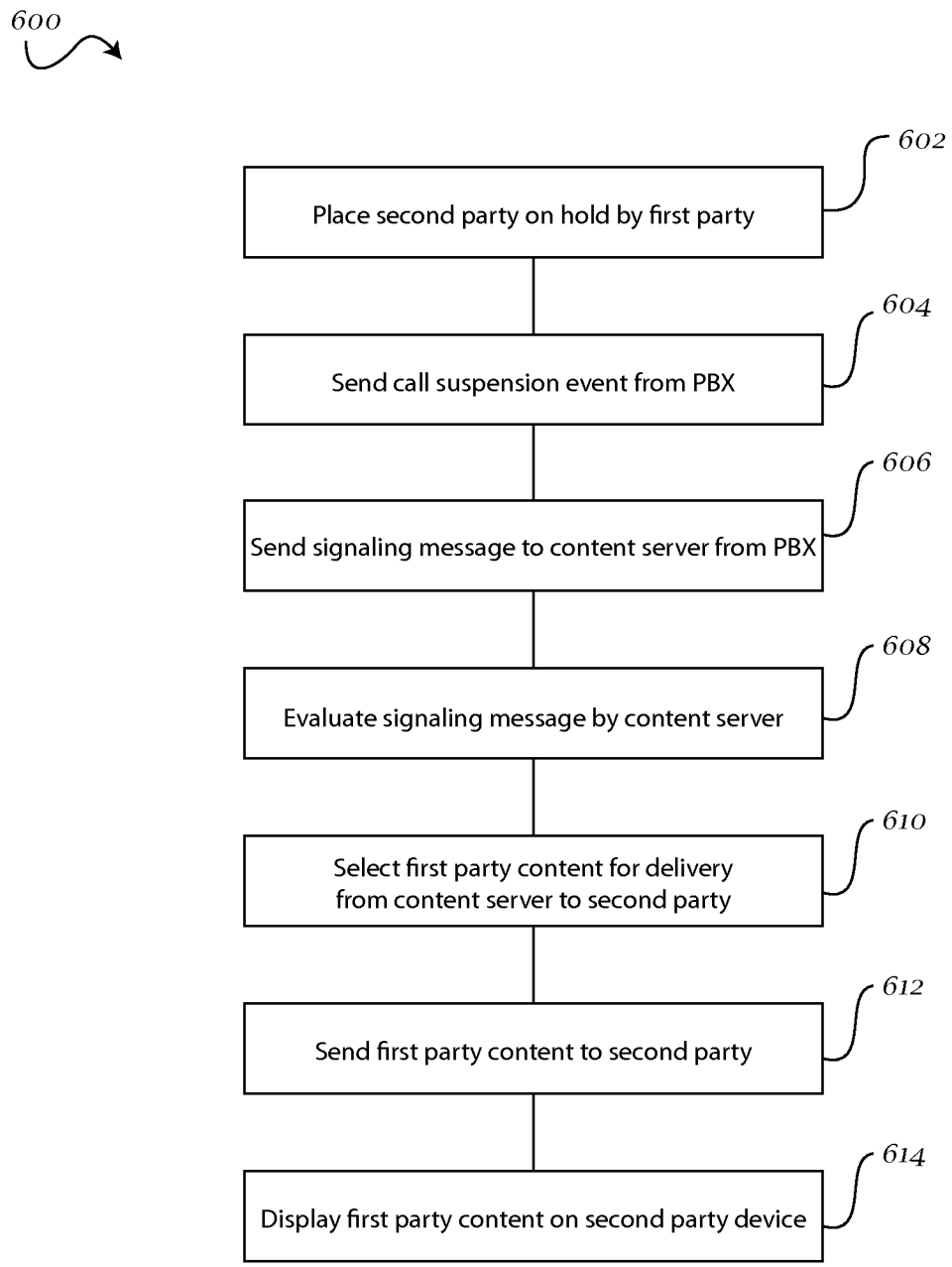
FIG. 9 shows an exemplary method of displaying content, wherein a first party places a second party on hold, the first party is behind a PBX, and the content is stored on a content server.

FIG. 9 shows an exemplary method of displaying content 600, wherein a first party places a second party on hold, the first party is behind a PBX 72, and the content is stored on a content server 64. At step 602, during a call in progress between a first party and a second party, the first party can place the second party on hold, for example by answering an incoming call, or by activating a call hold feature. At step 604, the PBX can recognize that the state of the communications device 76 has issued a hold call request and issue a call suspension event, and the state of the mobile communications application of the second party can be changed from "call in progress" to "on hold". PBX 72 can further send a signaling message, at step 606, to content server 64 acting as an SCP 66 or AS 68. At step 608, content server 64 can evaluate the signaling message so as to determine the first party and determine the second party.

At step 610, content server 64 can select the content of the first party for delivery to the second party, in a substantially similar manner to that described in step 110*a*. Subsequently, at step 612, the content server can resolve the address of the second party and deliver the selected first party content to the mobile communications device of the second party. At step 614, the mobile communications device of the second party can display the received first party content while the state of the mobile communications application of the second party is "on hold".

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for displaying content on a mobile communications device during an inactive call state, comprising:

storing first content, by a first mobile communications device on the first mobile communications device or on a content server, for transmission from the first mobile communications device to a second mobile communications device;

storing second content, by the second mobile communications device on the second mobile communications device or on the content server, for transmission from the second mobile communications device to the first mobile communications device;

detecting at least one external event relating to a call event, the external event comprising a user input following the call event;

selecting, based on the detection of the at least one external event, specific first content, from the stored first content, for transmission from the first mobile communications device to the second mobile communications device, and selecting specific second content, from the stored second content, for transmission from the second communications device to the first mobile communications device;

in response to the call event, the call event being based on a signal provided over a core network, the call event indicating a call to be performed over the core network, each of the first mobile communications device and the second mobile communications device configured to send and receive content and signals over the core network, performing at least one of:

issuing a content signaling message to the content server from the first mobile communications device instructing the content server to transmit the specific first content to the second mobile communications device via an IP network, each of the first mobile communications device and the second mobile communications device configured to send and receive content and signals to and from the content server over the IP network, the first mobile communications device having a first link to the content server via a first access point and the second mobile communications device having a second link to the content server via a second access point, and, when the content signaling message is received by the content server, evaluating the content signaling message on the content server and transmitting the first content to the second mobile communications device, wherein the content signaling message is a first communication from the first mobile communications device to the content server following the call event, and wherein a transmission of first content is a first communication from the content server to the second mobile communications device following the call event, or directly transmitting the specific first content from the first mobile communications device to the second mobile communications device by the IP network;

in response to the call event, performing at least one of:

issuing a content signaling message to the content server from the second mobile communications device instructing the content server to transmit the specific second content to the first mobile communications device via the IP network, and, when the content signaling message is received by the content server, evaluating the content signaling message on the content server and transmitting the second content to the first mobile communications device, wherein the content signaling message is a first communication from the second mobile communications device to the content server following the call event, and wherein a transmission of second content is a first communication from the content server to the first mobile communications device following the call event, or directly transmitting the specific second content from the second mobile communications device to the first mobile communications device by the IP network;

displaying the first content on the second mobile communications device and the second content on the first mobile communications device while the first mobile communications device is in an inactive call state;

wherein the call event includes a call initiation event or a call suspension event by the first mobile communications device, wherein the call initiation event includes at least one of a dialing or ringing state;

wherein the inactive call state includes a call initiation state or a call suspension state; and wherein the first and second content includes text, images, image sequences, or videos.

2. The method of claim 1, wherein the first and second content includes at least two types of content, a first type of content comprising personalized text and a second type of content comprising at least one of an image, an image sequence, or a video.

3. The method of claim 1, wherein the inactive call state is a call suspension state, and wherein the call suspension state is triggered by at least one of a user answering an incoming call or the user activating a call hold feature.

4. The method of claim 1, wherein the core network is at least one of a core network of a Public Land Mobile Network (PLMN) or a private branch exchange telephone system (PBX).

5. The method of claim 1, wherein the content signaling message is a first communication received by the content server from either of the first mobile communications device or the second mobile communications device following the call event.

6. A mobile communications device, comprising:

a processor;

a non-transitory storage medium;

a connectivity module for connecting to at least one communications network; and a mobile communications application, stored on the storage medium and executable by the processor, the mobile communications application being operable to cause content to be displayed on a second mobile communications device during initiation of a call by the mobile communications device with the second mobile communications device or during suspension of a call, initiated by the mobile communications device, with the second mobile communications device wherein the initiation of the call by the mobile communications device includes at least one of a dialing or ringing state;

wherein the mobile communications application is further operable to enable selecting specific content to be displayed on the second mobile communications device based on the detection of at least one external event relating to a call event, and wherein the external event comprises a user input following the call event, wherein the mobile communications device is configured to use a plurality of networks including an IP network and a network, the call event being based on a signal provided over the score network and indicating a call to be performed over the core network; and wherein the IP network is used to trigger the delivery of content to the second mobile communications device, each of the mobile communications device and the second mobile communications device configured to send and receive content and signals to and from the content server over the IP network, the mobile communications device having a first link to the content server via a first access point and the second mobile communications device having a second link to the content server via a second access point, the step of triggering the delivery of content to the second mobile communications device comprising performing at least one of:

issuing a signaling message to a content server from the mobile communications device instructing the content server to transmit the content to the second mobile communications device via the IP network, wherein the content server is configured to, when the signaling message is received, evaluate the signaling message on the content server and transmit the content to the second mobile communications device, wherein the signaling message is a first communication from the mobile communications device to the content server following the call event, and wherein a first communication received at the mobile communications device from the content server following the call event is a transmission of second content, different from the content, from the content server to the mobile communications device, or directly transmitting the content from the mobile communications device to the second mobile communications device by the IP network; and wherein the core network is used to connect a call from the mobile communications device to the second mobile communications device, each of the mobile communications device and the second mobile communications device configured to send and receive content and signals over the core network.

7. The mobile communications device of claim 6, wherein the step of triggering the delivery of content to the second mobile communications device comprises sending the signaling message to the content server having content stored thereon.

8. The mobile communications device of claim 6, wherein the mobile communications application is further operable to transmit content stored on the storage medium of the mobile communications device to the second mobile communications device.

9. The mobile communications device of claim 6, wherein the mobile communications application is further operable to select specific content for transmission to the second mobile communications device.

10. The mobile communications device of claim 9, wherein the mobile communications application is further operable to enable selecting specific content based on the identity of the second mobile communications device.

11. The mobile communications device of claim 6, wherein the mobile communications application is operable to cause content to be displayed on a second mobile communications device during suspension of a call, initiated by the mobile communications device, with the second mobile communications device, the suspension of the call configured to be triggered by at least one of a user answering an incoming call or the user activating a call hold feature.

12. The mobile communications device of claim 6, wherein the core network is at least one of a core network of a Public Land Mobile Network (PLMN) or a private branch exchange telephone system (PBX).

13. A method for displaying content on a mobile communications device during an inactive call state, comprising:

storing first content, by a first mobile communications device, on a content server, for transmission to a second mobile communications device;

storing second content, by the second mobile communications device, on the content server, for transmission to the first mobile communications device;

detecting at least one external event relating to a call event, wherein the external event comprises a user input following the call event, said user input being made on the first mobile communications device or the second mobile communications device and received on the content server following the call event;

selecting, based on the detection of the at least one external event, specific first content, from the stored first content, for transmission to the second mobile communications device, and selecting specific second content, from the stored second content, for transmission to the first mobile communications device;

in response to the call event, the call event being based on a signal provided over a core network, the call event indicating a call to be performed over the core network, each of the first mobile communications device and the second mobile communications device configured to send and receive content and signals over the core network, performing at least one of:

issuing a content signaling message to the content server from the first mobile communications device instructing the content server to transmit the specific first content to the second mobile communications device by an IP network, each of the first mobile communications device and the second mobile communications device configured to send and receive content and signals to and from the content server over the IP network, the first mobile communications device having a first link to the content server via a first access point and the second mobile communications device having a second link to the content server via a second access point, and, when the content signaling message is received by the content server, evaluating the content signaling message on the content server and transmitting the first content to the second mobile communications device, wherein the content signaling message is a first communication from the first mobile communications device to the content server following the call event, and wherein a transmission of first content is a first communication from the content server to the second mobile communications device following the call event, or directly transmitting the specific first content from the first mobile communications device to the second mobile communications device by the IP network;

in response to the call event, performing at least one of:

issuing a content signaling message to the content server from the second mobile communications device instructing the content server to transmit the specific second content to the first mobile communications device by the IP network, and, when the content signaling message is received by the content server, evaluating the content signaling message on the content server and transmitting the second content to the first mobile communications device, wherein the content signaling message is a first communication from the second mobile communications device to the content server following the call event, and wherein a transmission of second content is a first communication from the content server to the first mobile communications device following the call event, or directly transmitting the specific second content from the second mobile communications device to the first mobile communications device by the IP network;

displaying the first content on the second mobile communications device and the second content on the first mobile communications device while the first mobile communications device is in an inactive call state;

wherein the call event includes a call initiation event or a call suspension event by the first mobile communications device, wherein the call initiation event includes at least one of a dialing or ringing state;

wherein the inactive call state includes a call initiation state or a call suspension state; and wherein the first and second content includes text, images, image sequences, or videos.

14. The method of claim 13, wherein the first and second content includes at least two types of content, a first type of content comprising personalized text and a second type of content comprising at least one of an image, an image sequence, or a video.

15. The method of claim 13, wherein the content server further comprises Service Control Point (SCP) and Application Server (AS) functional modules configured to interpret signaling messages received from at least one of the first mobile communications device, the second mobile communications device, a Public Switched Telephone Network (PSTN), or a Private Branch Exchange (PBX).

16. The method of claim 13, wherein the steps of transmitting content over the IP network to the first and the second mobile communications devices each comprise transmitting content by push communication.

17. The method of claim 13, wherein the inactive call state is a call suspension state, and wherein the call suspension state is triggered by at least one of a user answering an incoming call or the user activating a call hold feature.

18. The method of claim 13, wherein the network is at least one of a core network of a Public Land Mobile Network (PLMN) or a private branch exchange telephone system (PBX).

* * * * *